(No Model.)
D. SHIELDS.
CUTTING APPARATUS FOR HARVESTERS.
No. 336,670. Patented Feb. 23, 1886.
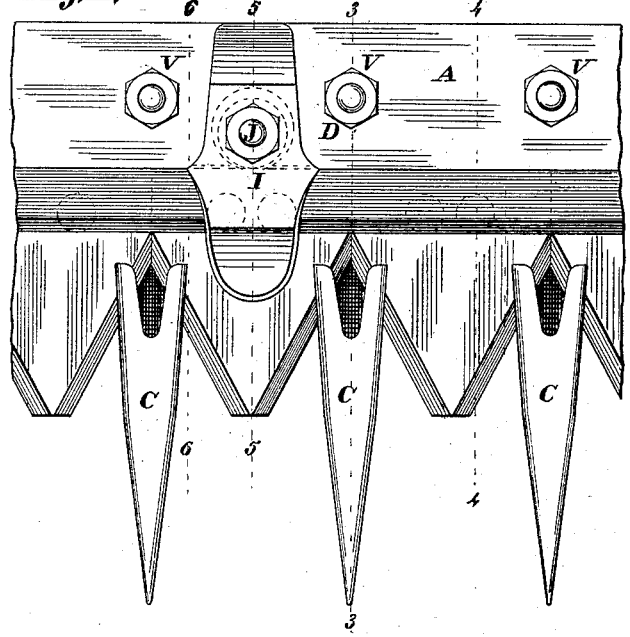
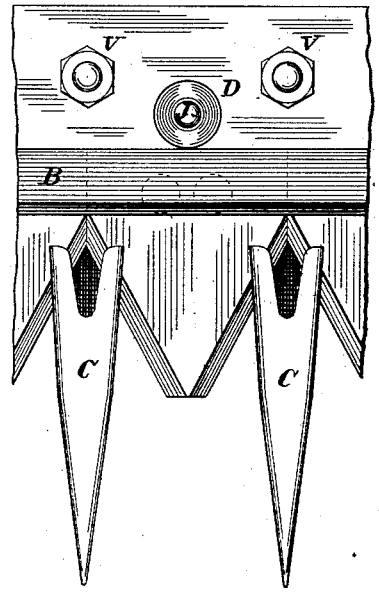
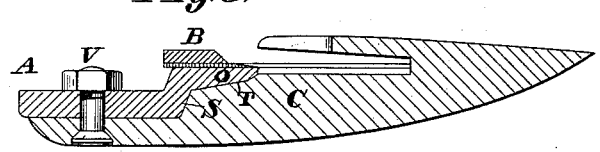
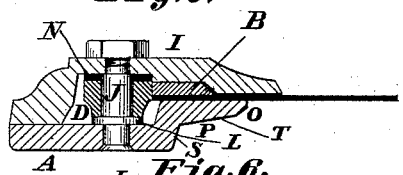
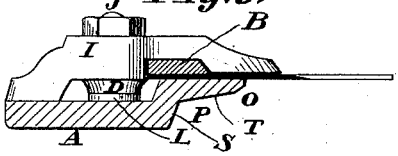
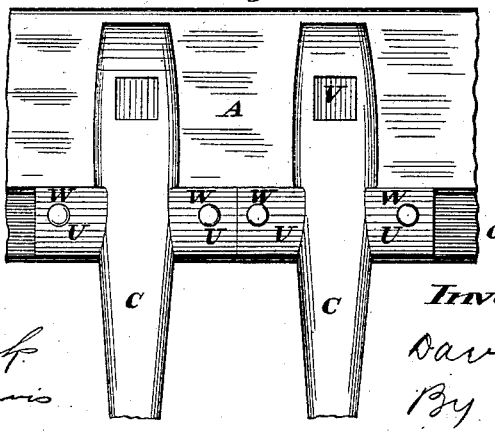
Attest:
Geo. L. Wheelock
Victor A. Lewis
Inventor:
David Shields
By Knight Bros
Attys
N. PETERS. Photo-Lithographer, Washington, D. C.

UNITED STATES PATENT OFFICE.

DAVID SHIELDS, OF QUINCY, ILLINOIS.

CUTTING APPARATUS FOR HARVESTERS.

SPECIFICATION forming part of Letters Patent No. 336,670, dated February 23, 1886.

Application filed October 18, 1884. Serial No. 145,828. (No model.)

*To all whom it may concern:*

Be it known that I, DAVID SHIELDS, of Quincy, in the county of Adams and State of Illinois, have invented a certain new and useful Improvement is Cutting Apparatus for Harvesters, of which the following is a full, clear, and exact description, reference being had to the accompanying drawings, forming part of this specification, and in which—

Figure 1 is a top view illustrating my improvement. Fig. 2 is a similar view with the clip removed to show the anti-friction roller. Figs. 3, 4, 5, and 6 are transverse sections taken, respectively, on lines 3 3, 4 4, 5 5, and 6 6, Fig. 1. Fig. 7 is a detail bottom view.

My invention relates to certain improvements in reaping and mowing machines; and it consists in features of novelty hereinafter fully described, and pointed out in the claims.

Referring to the drawings, A represents the finger-bar, B the cutter-bar, and C the finger-guards, of a mowing or reaping machine.

D represents anti-friction rollers secured or journaled to the finger-bar just behind the cutter-bar, so that the cutter-bar bears against them when the machine is at work, which adds greatly to the easy running of the machine and reduces the wear of the gearing and other parts. The rollers are secured to the bar by clips I and bolts J, (see Figs. 1, 5, and 6,) the bolts passing through the bar, rollers, and clips, as shown in Fig. 5. The clips extend over and engage the back of the cutter-bar, as shown. The cutters are secured to the under side of the cutter-bar. Metal or other suitable washers, L, are preferably placed beneath, and felt washers N above, the rollers, those, N, being soaked with oil to lubricate the journals of the rollers. While the rollers are behind the cutter-bar, yet they are supported above the top of the finger-bar, as shown, (which is permitted by the upturned ledge O of the bar hereinafter described, and the cutter-bar being above the cutters,) so as to permit dirt and short grass and stuff to fall down away from the cutter-bar and rollers, and not clog and interfere with the easy turning of the rollers. The front part of the finger-bar has an overhanging ledge, O, on which the cutters slide, forming a longitudinal recess, P, with a vertical part, S, and horizontal part T, both of which are preferably slightly inclined, as shown in Figs. 3, 5, and 6. The guard-fingers fit this recess, and have wings or projections U, that also fit the recess, as shown in Figs. 3, 4, and 7.

V represents bolts passing through the guards and finger-bar, and W screws passing through the wings of the guards and ledge of the bar to secure the guards to the bar. By thus forming the bar with the vertical part or wall S and horizontal part or wall T, and the guards with wings to fit these parts, the guards are held rigidly from the slightest movement in any direction when held to the bar by the bolts and screws, and are not liable to get loose and move laterally.

I am aware that I am not the first to place rollers behind the cutter-bars of harvesters, reapers, and mowers, and do not claim the same, broadly; but What I do claim, and desire to secure by Letters Patent, is—

1. In combination with the finger and cutter bars, the rollers journaled to the finger-bar behind the cutter-bar and located a distance above the finger-bar, leaving a space between their lower parts and the finger-bar, for the purpose set forth.

2. In combination with the finger-bar having the upturned ledge O, and cutter-bar with cutters secured to its under side, the rollers journaled to the finger-bar behind the cutter-bar a distance above the finger-bar, leaving a space between their lower parts and the ledge in front and below, substantially as shown and described, for the purpose set forth.

DAVID SHIELDS.

In presence of—
GEO. H. KNIGHT,
SAML. KNIGHT.